United States Patent [19]

Kumagai et al.

[11] Patent Number: 5,537,201
[45] Date of Patent: Jul. 16, 1996

[54] ELECTRONIC LEVELING SYSTEM, ELECTRONIC LEVELING APPARATUS AND LEVELING STAFF

[75] Inventors: Kaoru Kumagai; Shinji Kawashima; Kiichi Furuya; Fumio Ohtomo, all of Tokyo, Japan

[73] Assignee: Kabushiki Kaisha Topcon, Tokyo, Japan

[21] Appl. No.: 197,075

[22] Filed: Feb. 16, 1994

[30] Foreign Application Priority Data

Feb. 16, 1993 [JP] Japan .................................. 5-051339
Feb. 16, 1993 [JP] Japan .................................. 5-051340
Feb. 16, 1993 [JP] Japan .................................. 5-051341

[51] Int. Cl.$^6$ ............................. G01C 3/08; G01C 21/02; G01C 15/02
[52] U.S. Cl. ..................... 356/4.08; 33/293; 356/4.03
[58] Field of Search ........................... 356/139.1, 4.01, 356/4.03, 4.08; 33/293–295

[56] References Cited

U.S. PATENT DOCUMENTS

| | | | |
|---|---|---|---|
| 3,680,958 | 8/1972 | Von Bose | 356/139.06 |
| 3,846,026 | 11/1974 | Waters . | |
| 4,029,415 | 6/1977 | Johnson | 33/294 |
| 4,488,050 | 12/1984 | Iwafune | 33/293 |
| 4,673,287 | 6/1987 | Rickus | 33/294 |
| 4,715,714 | 12/1987 | Gaechter et al. | 356/375 |
| 5,087,125 | 2/1992 | Narutaki | 33/294 |

FOREIGN PATENT DOCUMENTS 0290140 of 0000 European Pat. Off. .

*Primary Examiner*—Stephen C. Buczinski
*Attorney, Agent, or Firm*—Brumbaugh, Graves, Donohue & Raymond

[57] ABSTRACT

An electronic leveling system, which is intended to enhance the efficiency of leveling work, is capable of sending various data generated on the part of the electronic level unit from it to the electronic leveling staff and sending various data generated on the part of the leveling staff from it to the leveling unit. The system includes a function of compensating automatically the tilt of the leveling unit and leveling staff.

17 Claims, 18 Drawing Sheets

PERIOD OF A AND B

INTERVAL OF A/B/R SET

PATTERN PITCH n: NUMBER OF SAMPLES OF FFT

CORRESPONDS TO PATTERN PITCH $\theta$: PHASE RESULTING FROM FFT

START BIT 0

END BIT n-1

HORIZONTAL POSITION BIT m

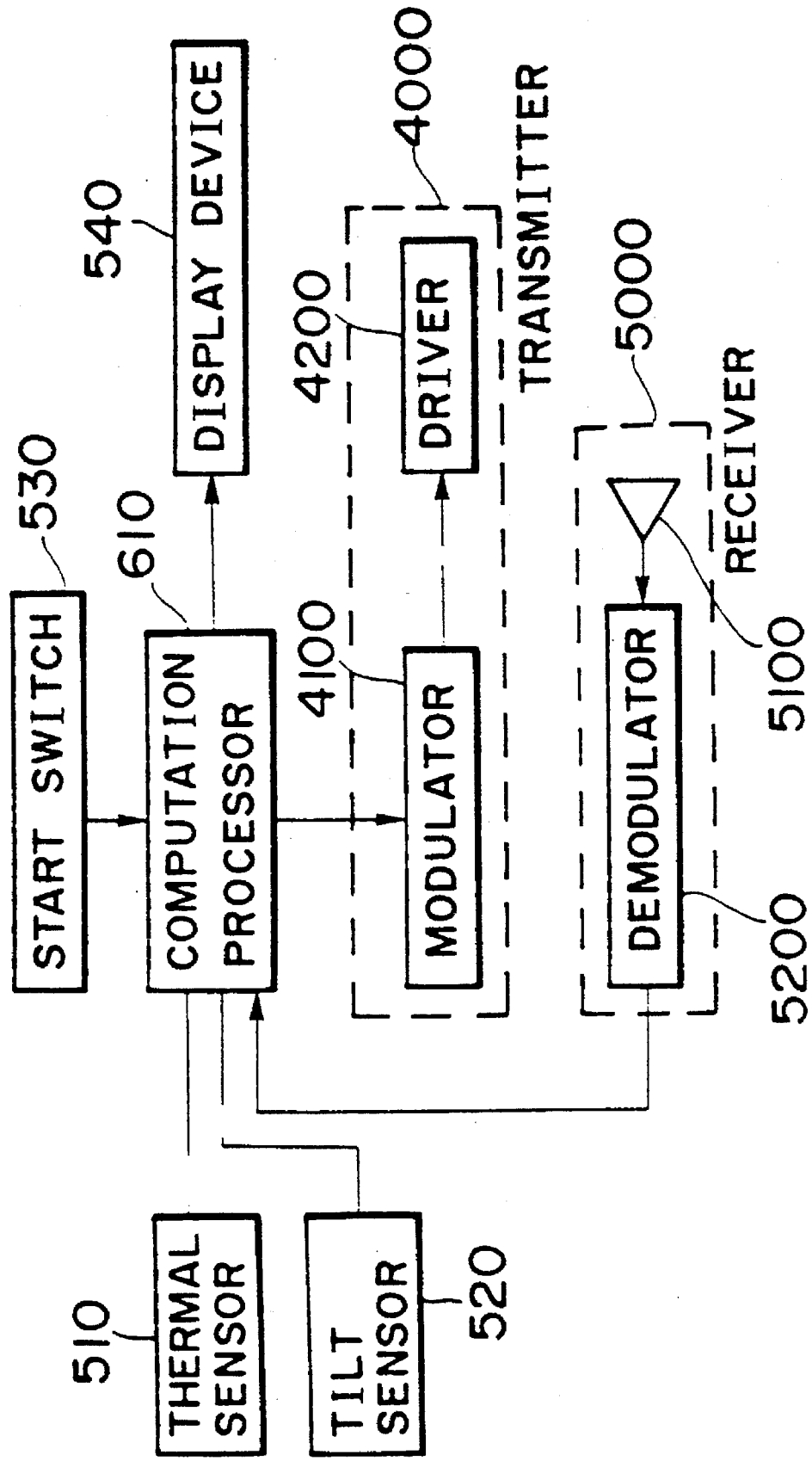

ELECTRONIC LEVEL

LEVELING STAFF

DISPLAY DEVICE

FIG.24
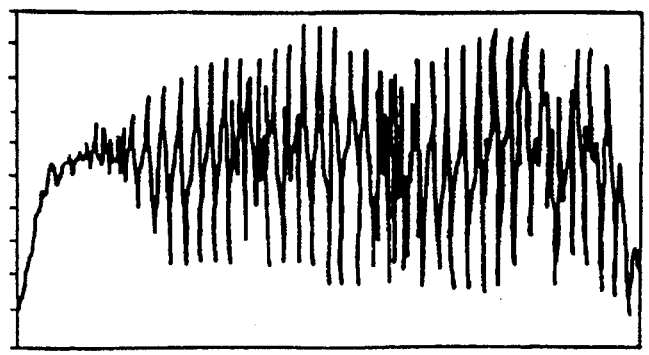
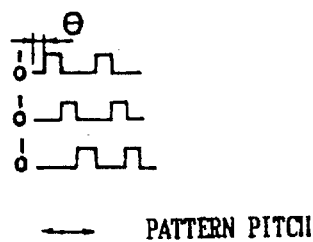
→ PATTERN PITCH
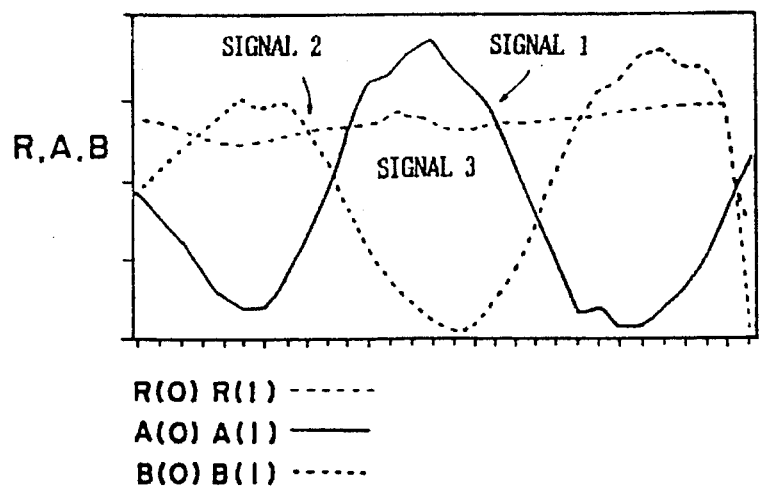
R(0) R(1) ------
A(0) A(1) ———
B(0) B(1) ······
FIG.25
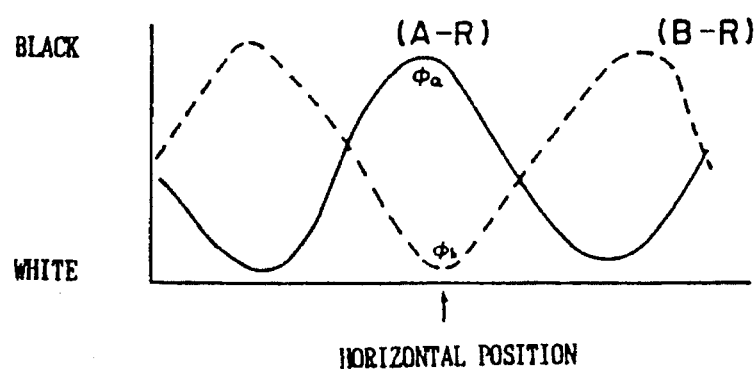

5,537,201

ELECTRONIC LEVELING SYSTEM, ELECTRONIC LEVELING APPARATUS AND LEVELING STAFF

BACKGROUND OF THE INVENTION

The present invention relates to an electronic leveling system, an electronic leveling apparatus and a leveling staff, and particularly to an electronic leveling system in which the electronic leveling unit can send various data generated on it to the leveling staff and the leveling staff can send various data generated on it to the leveling unit. The system is capable of calculating automatically the amount of modulation for the measurement result for compensating the tilt of the leveling unit and leveling staff through the detection of their tilt angles.

For the direct measurement of the ground level or the like, a set of leveling unit and leveling staff has been used conventionally. The leveler uses the leveling unit to view the scale on the leveling staff and measures the difference of height between positions. However, this traditional leveling scheme involves a read error made by the leveler. With the intention of overcoming the leveler's read error, electronic leveling systems in which the scale on the leveling staff is read electronically have been developed. One electronic leveling system is designed to emit a prescribed optical signal from the leveling staff and receive and identify the optical signal on the leveling unit thereby to read the scale on the leveling staff.

The applicant of the present invention has developed an electronic leveling apparatus that is operative to determine the height difference between positions electronically, as described in U.S. patent application Ser. No. 08/082,082. This electronic leveling apparatus uses a leveling staff 2 having a cyclic arrangement of a pattern set, with each block consisting of a first pattern A, second pattern B and third pattern R at a constant pitch of p, as shown in FIG. 2.

The lowest pattern block is defined to be block 0 which includes R(0), A(0) and B(0), the next block is block 1 including R(1), A(1), B(1), the next block is block 2 including R(2), A(2), B(2), and so on. A reference signal is produced in correspondence to the constant pattern pitch p. The third pattern R has a constant length of 8 mm for its black section, whereas the first pattern A has its length modulated to have a period of 600 mm and the second pattern B has its length modulated to have a period of 570 mm.

However, the above-mentioned electronic leveling apparatus for evaluating the height difference automatically cannot measure the height difference accurately if the leveling staff tilts or the ambient temperature varies.

In addition, it compels the leveler and workman to have a voiced communication, which often necessitates a transceiver set, for telling the readiness of the leveling staff or the like. The leveling staff having only the formation of scale pattern for electronic reading does not allow the leveler to have the visual measurement for the immediate verification of the result of electronic measurement.

Moreover, for the compensation against the tilt of leveling staff and the temperature variation, it requires a modifying calculation for the measured data based on the circumstantial data at each time of measurement. It requires a workman's hard work to set up a front and rear leveling staffs that need to be equidistant from the leveling unit at the determination of the starting point.

BRIEF DESCRIPTION OF THE DRAWINGS

FIG. 9 is a diagram used to explain the electrical arrangement of the leveling staff 2 used with the electronic level of the second embodiment;

FIG. 23 FIG. 24 and FIG. 25 are diagrams used to explain the principle of long-distance measurement based on the first embodiment of invention;

DESCRIPTION OF THE PREFERRED EMBODIMENTS

The embodiments of this invention will be explained with reference to the drawings.

[Embodiment 1]

Figure 1:
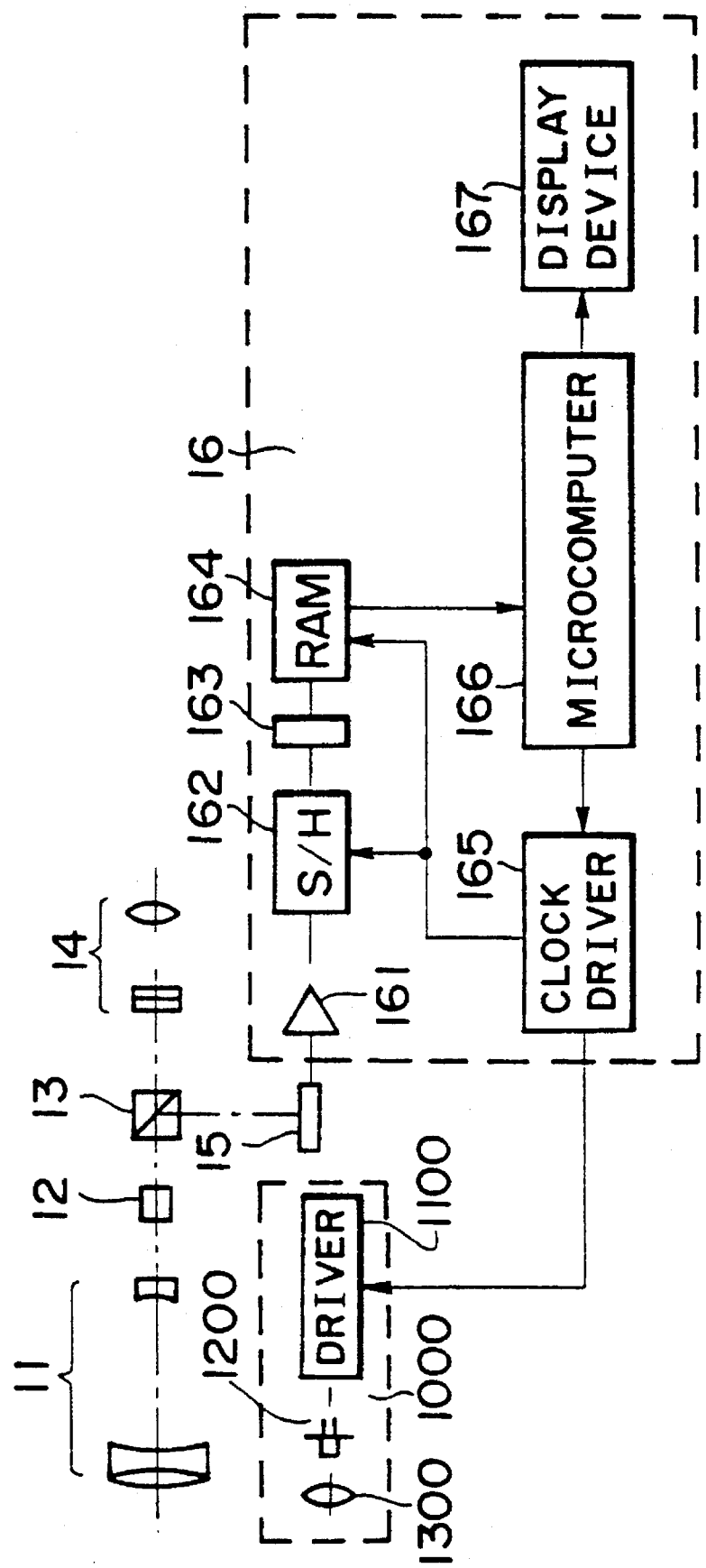
FIG. 1 is a block diagram showing the electrical arrangement of the electronic level 1 based on the first embodiment of this invention.
Figure 2A:
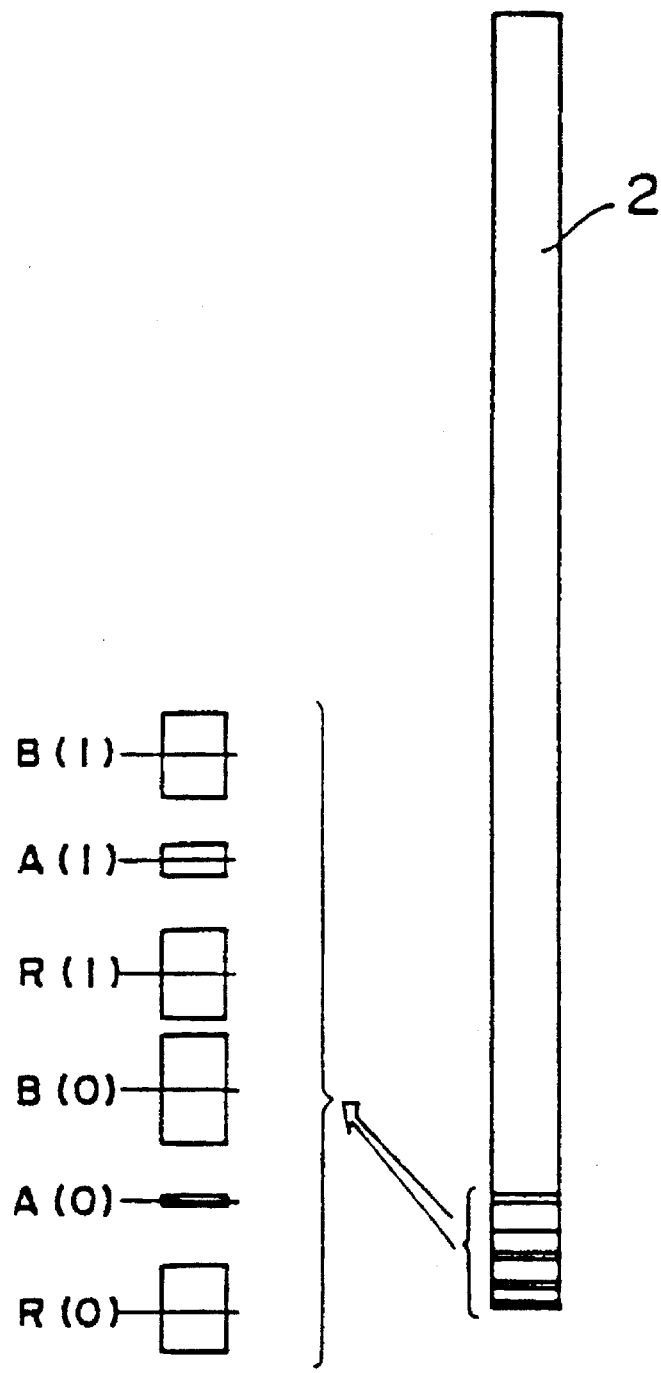
FIG. 2 is a diagram used to explain the leveling staff 2 used with the electronic level shown in FIG. 1.
Figure 2:
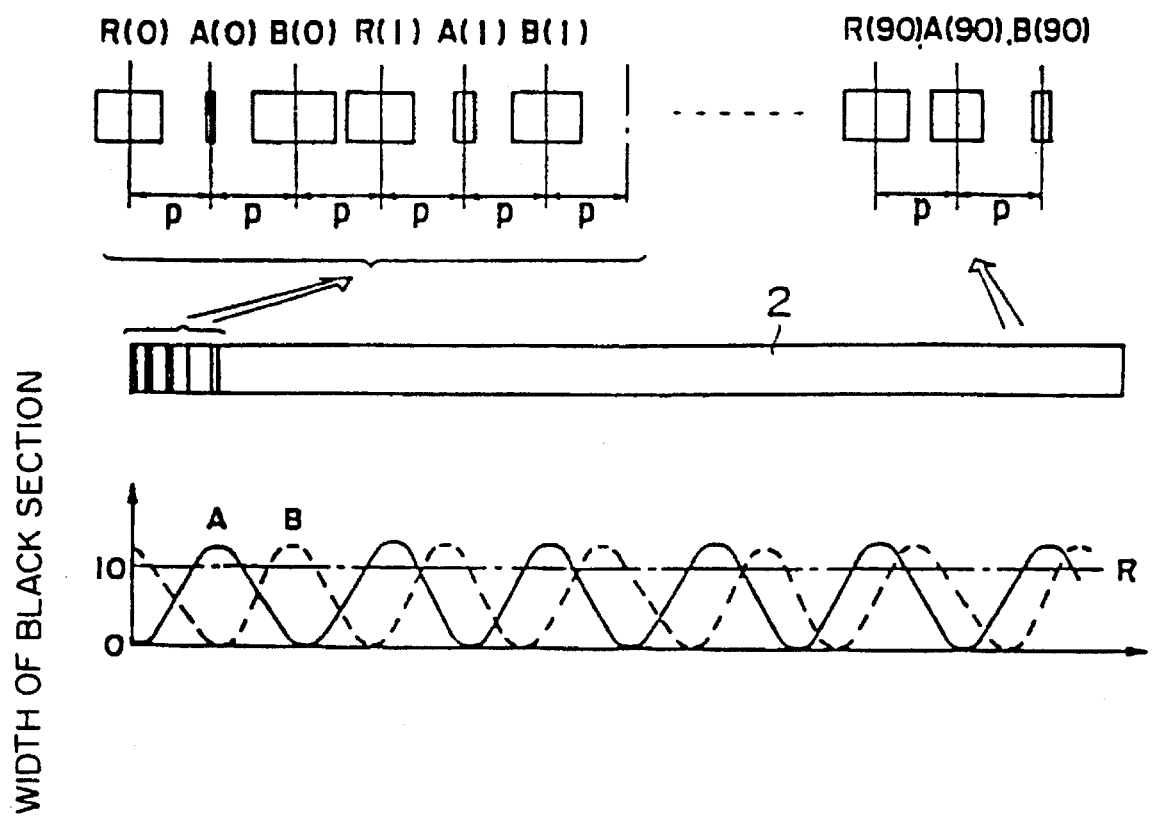
Figure 3:
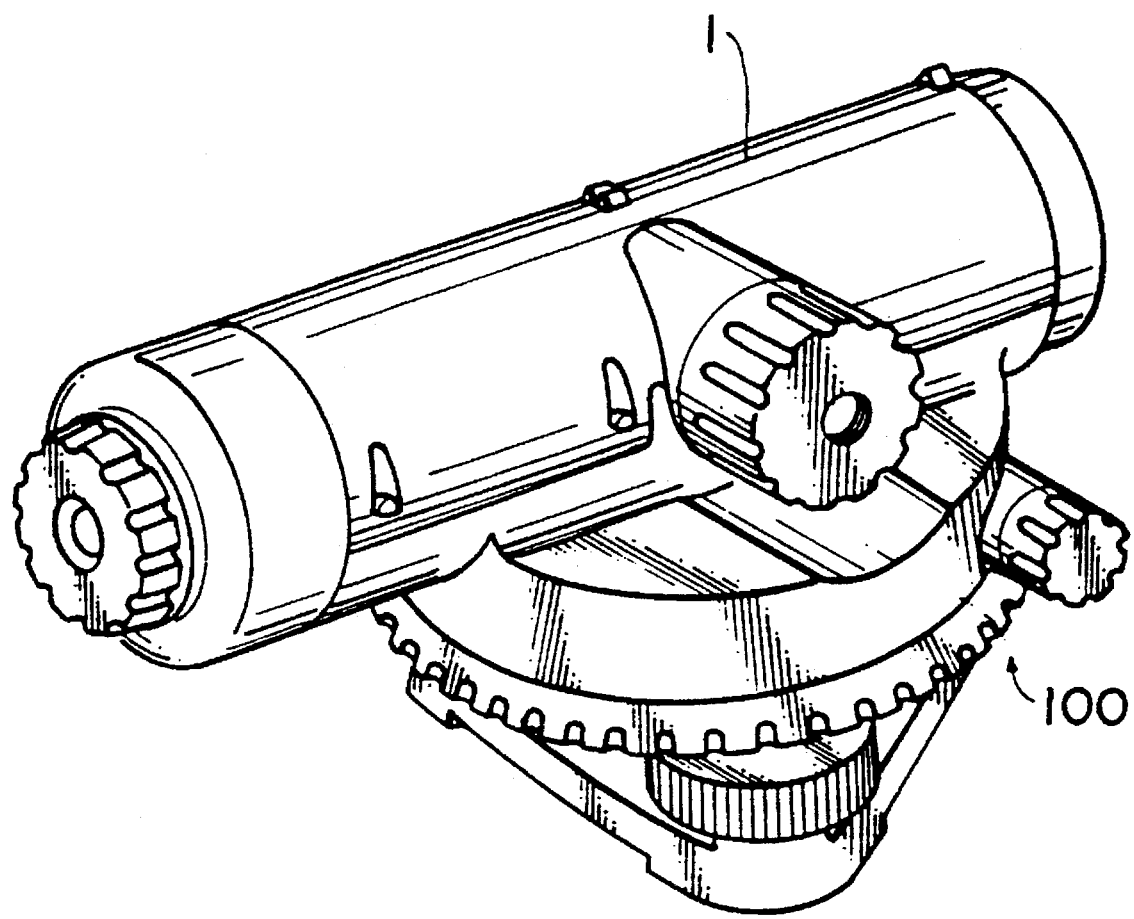
FIG. 3 is a perspective view of the electronic level 1 of the first embodiment.

The leveling system of this embodiment consists of an electronic level 1 and a leveling staff 2 as shown in FIG. 1 through FIG. 3. The electronic level 1 is mounted on a tribrach 100 as shown in FIG. 3, and it consists of an optical system including an objective lens set 11, a compensator 12, a beam splitter 13 and an eyepiece set 14, a linear sensor 15, a computation means 16 and an operation indicator means 1000, as shown in FIG. 1.

The objective lens set 11, which forms an image of the scale pattern of the leveling staff 2, consists of an objective lens and an internal lens which is movable to focus the image. The compensator 12 is an automatic mechanism for maintaining the sight line horizontal thereby to offset some inclination of the optical axis of the electronic level 1. The beam splitter 13 splits the incident light beam into two directions toward the eyepiece set 14 and the linear sensor 15. The eyepiece set 14 is used by the leveler to view the scale on the leveling staff 2. The linear sensor 15 constitutes an opto-electric transducer which converts the scale pattern image formed by the objective lens set into an electrical signal. The linear sensor 15, which is a CCD linear sensor in this embodiment, can be any optical sensor having an array of photodiodes of at least one dimension.

The computation means 16 consists of an amplifier 161, a sample-holding circuit 162, an A/D converter 163, a RAM 164, a clock driver 165, and a microcomputer 166, and it is connected with a display device 167.

The operation indicator means 1000 is intended to enable the workman at the leveling staff 2 to know that the electronic level 1 is operating on the linear sensor 15 to carry out the measurement. The operation indicator means 1000 consists of an LED (light emitting diode) driver 1100, an LED 1200 and an indication optical system 1300. During the measuring operation of the electronic level 1, a clock driver 165 in the computation means 16 activates the LED driver 1100 in synchronism with the operation of the linear sensor 15. Consequently, the workman at the leveling staff 2 can know by watching the light signal of the LED 1200 that the electronic level 1 is amid measurement.

The operation indicator means 1000 constitutes a first transmission device for sending data necessary for the measurement including measurement status data and working instructions from the electronic level 1 to the leveling staff 2. The signal sent by the first transmission device can be an optical or acoustic signal. Accordingly, the operation indicator means 1000 is not confined to the LED 1200, but it can be any other device (for example, on speaker etc).

The leveling staff 2 used with the electronic level 1 has a cyclic arrangement of a pattern set consisting of a first pattern A, second pattern B and third pattern R at a constant pitch of p, as shown in FIG. 2(a),(b).

Next, the principle of measurement of the leveling system arranged as described above will be explained.

Initially, the measurement of horizontal position of the leveling staff 2 will be explained. Since the first pattern A is modulated for the width of black section in a period of 600 mm, the pattern width $D_A$ for a modulation width of 0–10 mm is expressed as follows.

$$D_A = 5 \times (1 + \sin(2 \times \pi \times X/600 - \pi/2)) \quad (1)$$

where X takes 10 mm, 40 mm, 70 mm, and so on. Similarly, the second pattern B modulated in a period of 570 mm has its pattern width $D_B$ expressed as follows.

$$D_B = 5 \times (1 + \sin(2 \times \pi \times X/570 + \pi/2)) \quad (2)$$

where X takes 20 mm, 50 mm, 80 mm, and so on.

The first and second patterns are modulated with offset phases of $\pm\pi/2$ with the intention of simplifying the separation of the signals resulting from these patterns.

Since the first pattern A and second pattern B have slightly different periods, the same pattern appears at the distance which is the minimum common multiple of the periods, i.e., at a distance of 11400 mm which is the minimum common multiple of 600 mm and 570 mm in this embodiment. Accordingly, the signals produced from the first and second patterns have phase differences varying between 0 and $2\pi$ over the range of 0–11400 mm.

For the signals of the first and second patterns having phases of $\phi_A$ and $\phi_B$, respectively, the horizontal position H of the leveling staff 2 is expressed as follows.

$$H = 11400 \times ((\phi_B - \phi_A - \pi)/(2\pi)) \text{ mm} \quad (3)$$

Next, the computation of the distance between the electronic level 1 and leveling staff 2 will be explained.

Figure 4:
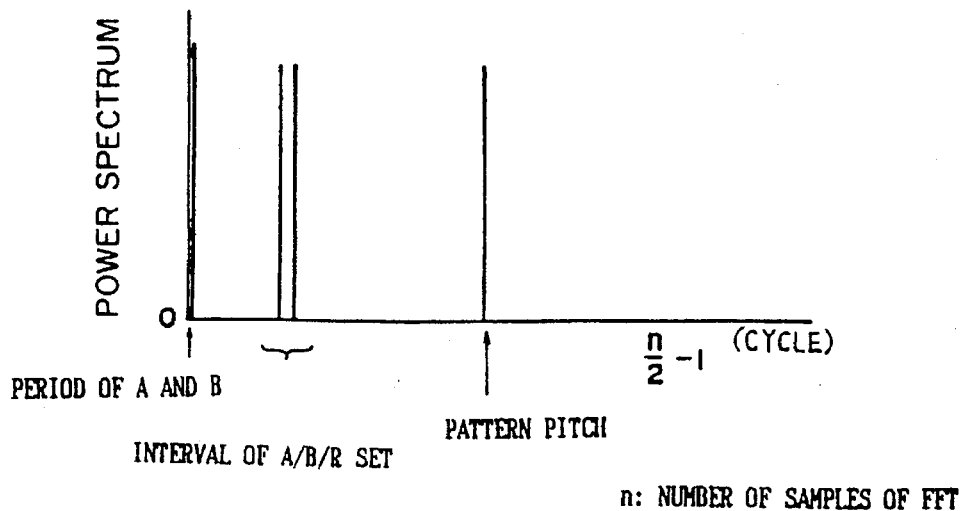
FIG. 4 is a graph showing the power spectrum of the output signal based on the first embodiment.

The electronic level 1 reads the scale on the leveling staff 2, and the resulting signal is rendered the Fourier transformation. As shown in the power spectrum graph of FIG. 4, signal components are separated into a frequency component of the reference signal corresponding to the pattern pitch p, a frequency component of the first pattern A, a frequency component of the second pattern B, and a frequency component (having a period three times that of the reference signal) of a set (block) of the third pattern R, first pattern A and second pattern B. These spectral frequencies move downward as the distance between the electronic level 1 and leveling staff 2 reduces. Among the all signal components, the reference signal has the smallest period (it corresponds to the constant pattern pitch p).

Since the pattern pitch p is fixed, the distance between the electronic level 1 and leveling staff 2 can be calculated based on the formula of lens focus.

Figure 15:
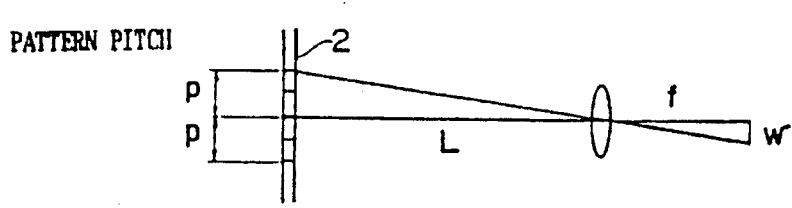
FIG. 15 is a diagram used to explain the principle of horizontal distance measurement.

Namely, as shown in FIG. 15 the lens produces an image width of w for the pattern pitch p, and the distance L between the level 1 and staff 2 is calculated from the distance d between the lens and image as follows.

$$L = d(p/w)$$

Since d is approximately equal to the focal distance f of the lens, $$L = d(p/w) \equiv f(p/w)$$

With the linear sensor 15 having a pixel length of C and an output wavelength of k corresponding to the pattern pitch p, the image length w produced by the lens is expressed as w=Ck. Accordingly, the distance L between the level 1 and staff 2 is calculated approximately as follows.

$$L = (f/C \times k) \times (p) \quad (4)$$

Next, the principle of leveling will be explained.

Figure 23:
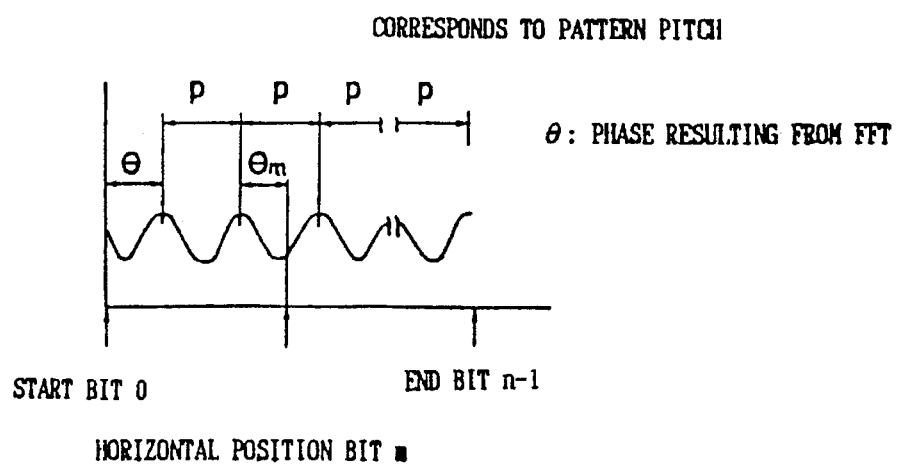

The first case is the long-distance leveling. The Fourier transformation for the output signal of the linear sensor 15 produces a signal which reflects the pattern pitch p, as shown in FIG. 23. For a phase $\theta$ resulting from the Fast Fourier transformation and a phase $\theta_m$ at the position on the linear sensor 15 (the m-th bit) which corresponds to the horizontal position, the horizontal position $H_1$ within the pitch p can be calculated accurately as follows (fine measurement).

$$H_1 = (\theta_m/360°) \times p \quad (5)$$

In order to measure the horizontal position, it is necessary to obtain the approximate position of the pitch p counted from the pattern starting position on the leveling staff 2. Initially, the output signal of the linear sensor 15 is integrated for the former and latter half pitches of the reference signal (it corresponds to the pattern pitch p). Extracting the integrated value at every third pulse (product detection) produces a signal 1 for the first pattern A, a signal 2 for the second pattern B and a signal 3 for the third pattern R, as shown in FIG. 24. The third pattern R of 8 mm is not modulated, whereas the first pattern A and second pattern B are modulated in a depth of 10 mm, and therefore the third pattern signal 3 having a virtually constant integrated value has a level of about 80% with respect to the signals 1 and 2.

Since the third pattern R, first pattern A and second pattern B are placed in a predetermined order cyclically, each extracted signal can be identified among the patterns. In order to remove the influence of optical disturbances such as the shading, differential signals A-R and B-R are produces on the basis of the signal of third pattern R, as shown in FIG. 25.

Subsequently, by selecting a set of signals R, A-R and B-R including the reference signal which includes the bit position (m-th bit) on the linear sensor 15 corresponding to the horizontal position and evaluating the phases of the A-R and B-R signals, it is possible to determine at which position on the leveling staff 2 is the combination of the first pattern A, second pattern B and third pattern R derived from.

For the A-R signal of level Am having a half-peak amplitude Wa and the B-R signal of level Bm having a half-peak amplitude Wb, these signals A-R and B-R have their phases expressed as follows.

$$\phi_a = \sin^{-1}(Am/Wa) \quad (60)$$

$$\phi_b = \sin^{-1}(Bm/Wb) - 2 \times \pi(10/570) \quad (70)$$

The reason for the second term of the expression (70) is that the position of the signal for the second pattern B has a 10 mm shift from that of the first pattern A.

By putting the expressions (60) and (70) into the expression (3), the horizontal position on the leveling staff 2 for the signal of the first pattern A can be calculated. In case the reference signal including the horizontal position belongs to the third pattern R, 10 mm is subtracted from the calculated horizontal position, or in case it belongs to the second pattern B, 10 mm is added to the calculated horizontal position. As a result, the approximate level $H_2$ of the horizontal position is obtained (coarse measurement).

In summary, the level H is measured by evaluating the phase of the reference signal at the horizontal position (fine measurement), determining the position of the reference signal for the horizontal position with respect to the pattern starting position on the leveling staff 2 based on the phase difference between the first pattern A and second pattern B (coarse measurement), and merging the fine measurement result $H_1$ and coarse measurement result $H_2$.

Next, the case of the short-distance measurement will be explained. Clear images of the first pattern A, second pattern B and third pattern R are produced in this case, and therefore more accurate leveling is expected through the direct measurement of the signal amplitude, instead of the product detection following the Fourier transformation which is the case of the long-distance measurement.

Figure 26:
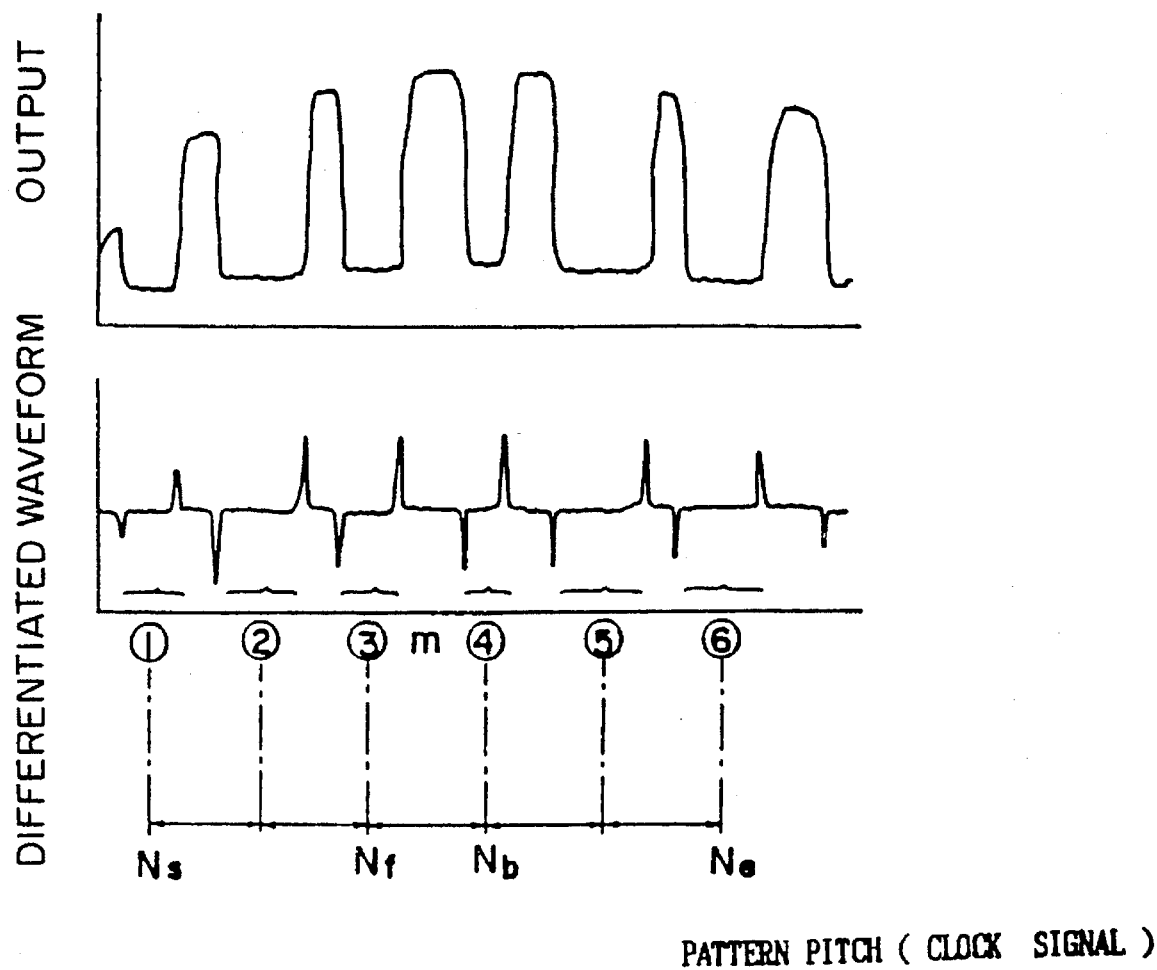
FIG. 26 is a diagram explaining the principle of short-distance measurement based on the first embodiment of invention.

Initially, the output signal of the linear sensor 15 is differentiated thereby to detect the rising edges and falling edges of the signal, as shown in FIG. 26. The width of black section of each pattern can be evaluated from the edges of the signal. Next, the central bit position of each black section is determined. A signal which represents the bit interval becomes the reference signal reflecting the constant pitch p of the first pattern A, second pattern B and third pattern R.

Since the period of the reference signal corresponds to 10 mm on the leveling staff 2, the positions of reference signals $N_f$ ($N_f$-th bit) and $N_b$ ($N_b$-th bit) at the front and back of the bit position (m-th bit) for the horizontal position (fine measurement) are expressed as follows.

$$H_1 = ((m - N_f)/(N_b - N_f)) \times 10 \quad (80)$$

For reference signals of n in number between the start position $N_s$ and end position $N_e$, the average interval k of reference signals is calculated by $$k = (N_e - N_s)/n$$

By putting the resulting value of k into the expression (4), the approximate distance between the electronic level 1 and leveling staff 2 can be obtained.

By extracting every third black section from the beginning and recognizing the third pattern R which is constant in width among the orderly alignment of the third pattern R, first pattern A and second pattern B, the correspondence of the extracted sections to the patterns R, A and B is determined.

Subsequently, determination is made as to which pattern among R, A and B and which pattern block does the reference signal that includes the bit position (m-th bit) of the linear sensor 15 for the horizontal position belong, e.g., the n-th block in the case of R(n), A(n) and B(n).

By substituting the $$D_A = 5 * (1 + \text{SIN}(2 * \pi * Xa/600 - \pi/2))$$

ti $Xa = 30 \times n + 10$ to the expression (1) for $D_A$, the value of n can be calculated from the $D_A$ as follows.

$$n = (10/\pi) \times (\phi_a + (\pi/2)) - (1/3) \quad (90)$$

$$\phi_a = \sin^{-1}((D_A/5) - 1)$$

One of two values of $\phi_a$ existing between 0 and $2\pi$ is selected based on the condition that n is an integer. This pattern block, with a block number na being given, exists at a 600 mm interval (i.e., every 20th block) on the leveling staff 2, and the n is calculated by $$n = 20 \times d + na$$

where d takes 0, 1, 2, 3, and so on.

The width $D_B$ of the second pattern B is calculated by using the resulting value of n.

By substituting the $$X = 30 \times n + 20$$

to the expression (2) and comparing the $D_B$ with the above calculation results of $D_B$, the block number n at which both $D_B$ values coincide is detected. The approximate level $H_2$ (coarse measurement) is calculated in one of the following three cases depending on as to which of the third pattern R, first pattern A and second pattern B do the determined n and m belong.

For the third pattern R: $H_2 = 30 \times n$

For the first pattern A: $H_2 = 30 \times n + 10$

For the second pattern B: $H_2 = 30 \times n + 20$ \quad (100)

Through the determination based on a few additional sets of patterns at the front and back of the inherent pattern set, the measurement error caused by a contaminated scale can be minimized.

In summary, the level H is obtained by producing the reference signal from the width of black sections of patterns R, A and B and determining a reference signal for the bit position corresponding to the horizontal position thereby to obtain a fine measurement result $H_1$, obtaining a coarse measurement result $H_2$ based on the phase difference between the signals of the first pattern A and second pattern B, and merging the fine measurement result $H_1$ and coarse measurement result $H_2$.

Although the foregoing measuring method is designed to distinguish signals of the modulated first pattern A and second pattern B based on the unmodulated third pattern R, the measurement without using the third pattern R is possible if the first pattern A and second pattern B can be identified based on other scheme, such as detecting the wavelengths of sensor output signals derived from both patterns.

Next, the computation means 16 incorporated in the electronic level 1 of this embodiment will be explained in detail. In FIG. 1, the amplifier 161 amplifies the signal produced by the linear sensor 15, and the sample-holding circuit 162 samples and holds the amplified signal in response to the timing signal provided by the clock driver 165. The A/D converter 163 converts the voltage signal held by the sample-holding circuit 162 into digital data, the RAM 164 stores the data, and the microcomputer 166 implements various computational processings.

The objective lens set 11, compensator 12, beam splitter 13 and eyepiece set 14 constitute a telescopic optical system, and the linear sensor 15 constitutes an opto-electric transducer.

Figure 5:
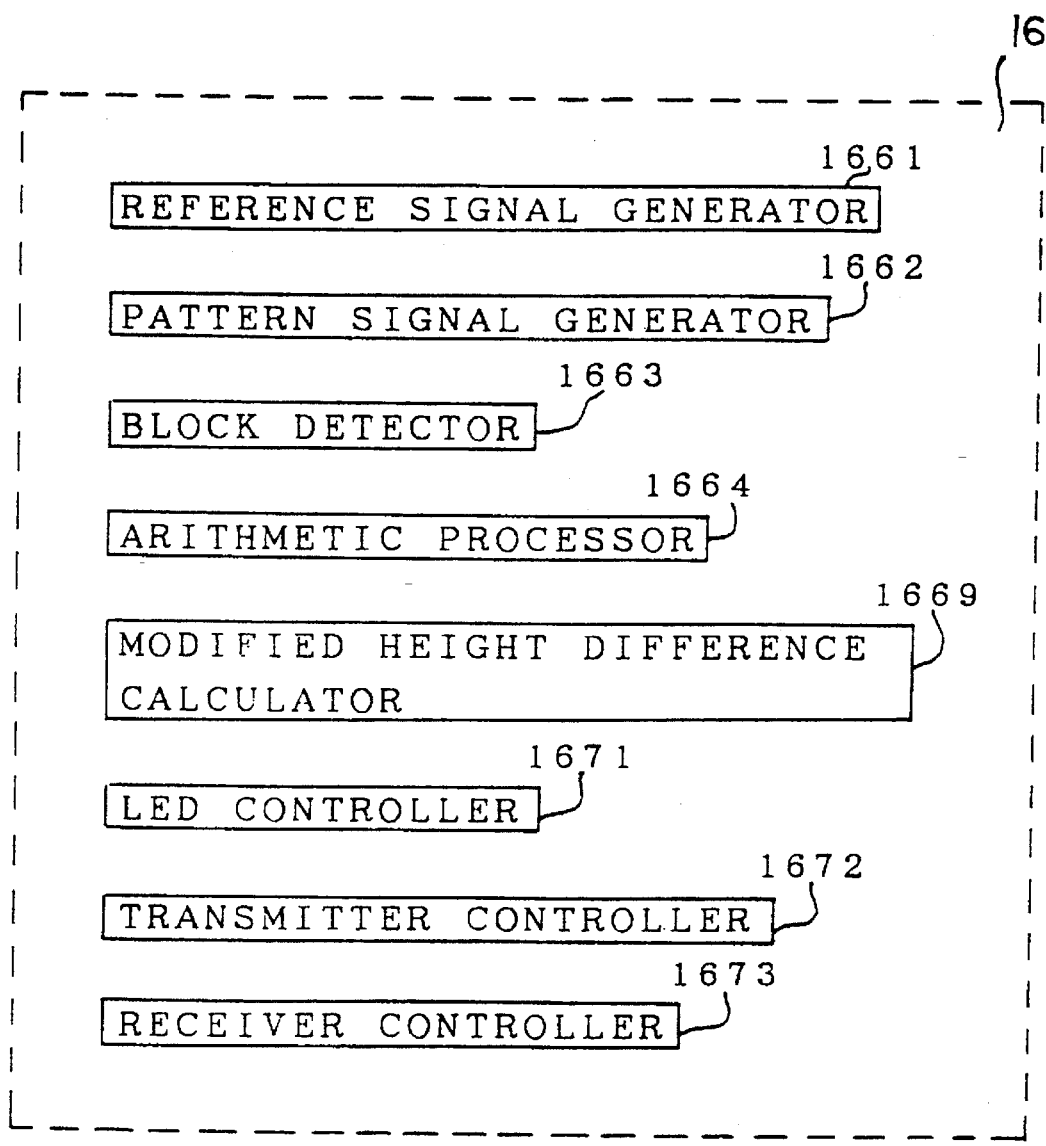
FIG. 5 is a diagram showing the arrangement of the computation means 16 of the electronic level 1 of the first embodiment.
Figure 6:
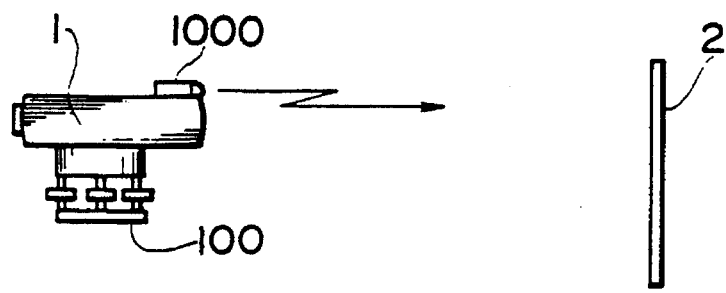
FIG. 6 is a diagram used to explain the operation indicator 1000 of the electronic level 1 of the first embodiment.

The functions of the microcomputer 166 will be explained with reference to FIG. 5. The computation means 16 is made up of functional blocks, which are a reference signal generator 1661, a pattern signal generator 1662, a block detector 1663, an arithmetic processor 1664, a modified height difference calculator 1669, an LED controller 1671, a transmitter controller 1672, and a receiver controller 1673.

The reference signal generator 1661 produces a reference signal that corresponds to the pattern pitch p through the fast Fourier transformation in the case of the long distance measurement, or produces a reference signal based on the rising edge and falling edge of the output signal of the linear sensor 15 through the differentiating operation for the signal in the case of the short distance measurement.

The pattern signal generator 1662 integrates the linear sensor output for the former and latter half pitches of the reference signal and extracts every third integrated value (product detection) thereby to produce a first pattern signal and second pattern signal in the case of the long distance measurement, or produces the first pattern signal and second pattern signal directly through the extracting operation in the case of the short distance measurement.

The block detector 1663 compares the length $D_A$ of the first pattern A with the length $D_B$ of the second pattern B thereby to determine the block position in the case of the short distance measurement. The arithmetic processor 1664 calculates the height difference based on the phases of the first pattern signal and second pattern signal at the sight line in the case of the long distance measurement, or calculates the height difference based on the determined block in the case of the short distance measurement.

The modified height difference calculator 1669 implements the modifying calculation for the height difference based on data of the tilt angle and temperature detected on the leveling staff 2. The LED controller 1671 controls the LED driver 1100, and the transmitter controller 1672 and receiver controller 1673 control the transmission means 2000 and reception means 3000 which will be explained later.

The display device 167, which may be a liquid crystal device, displays the height difference calculated by the arithmetic processor 1664. The calculation result may be delivered to an external memory means or the like. It is also possible in this embodiment to modify the height h calculated by the arithmetic processor 1664 in response to the tilt angle θ and temperature t detected on the leveling staff 2 so that a modified height h' is displayed.

[Embodiment 2]

Figure 7:
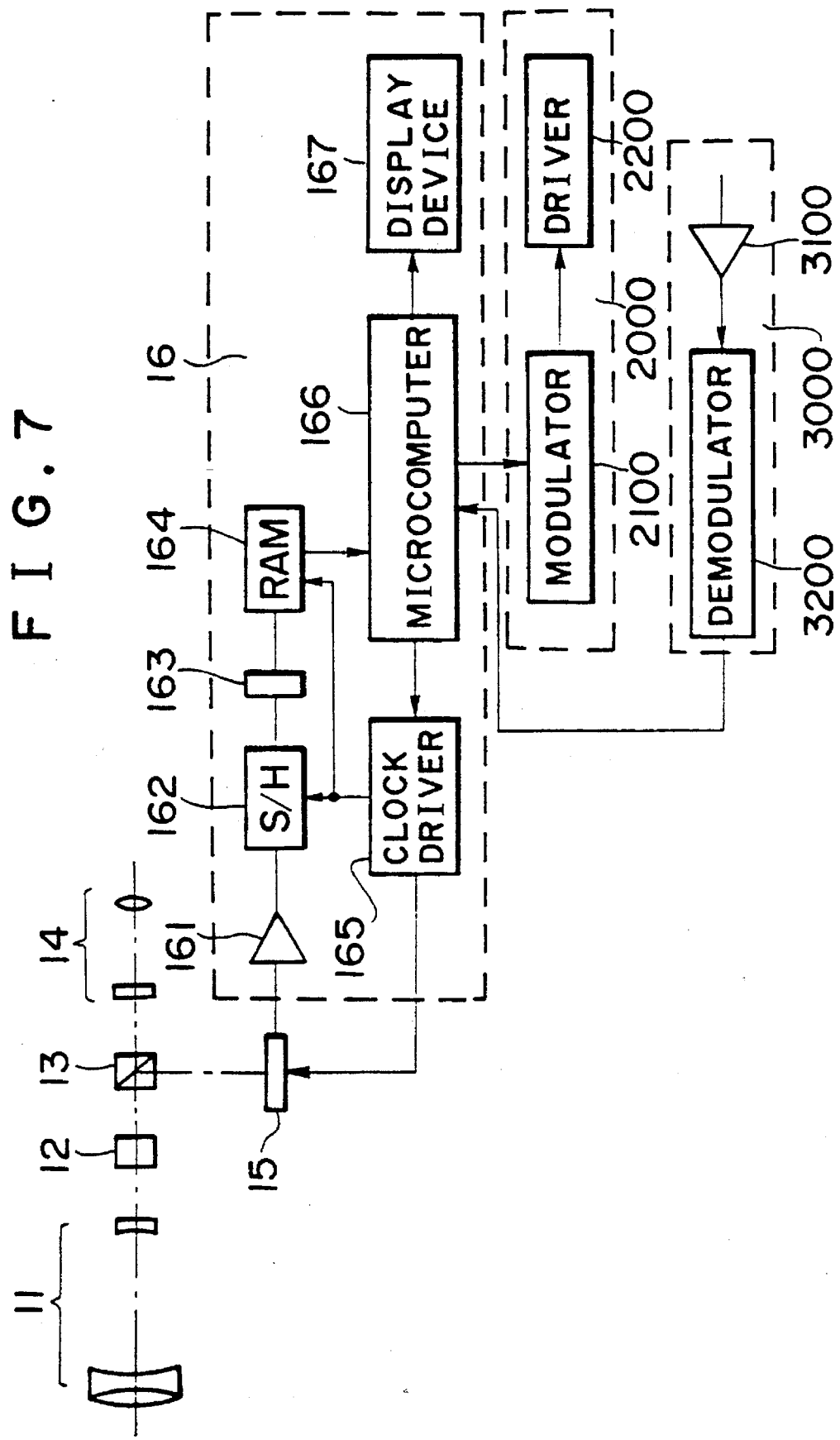
FIG. 7 is a block diagram showing the electronic level 1 based on the second embodiment of this invention.

The electronic level 1 based on the second embodiment of this embodiment will be explained with reference to FIG. 7. The apparatus consists of an optical system including an objective lens set 11, a compensator 12, a beam splitter 13 and an eyepiece set 14, a linear sensor 15, a computation means 16, a transmission means 2000 and reception means 3000.

The transmission means 2000 sends data of the horizontal distance, and height difference and the measurement status and working instructions to the leveling staff 2, and it consists of a modulator 2100 which operates in accordance with commands from the microcomputer 166 to modulate the data and instructions, and a driver 2200 which amplifies the modulated signal for transmission. The transmission means 2000 constitutes the first transmission device. The measurement status sent by the transmission means 2000 includes "amid measurement", "end of measurement" "failure of measurement", and working instructions include "move the staff position", for example.

The reception means 3000 receives the staff readiness signal and staff data obtained on the leveling staff 2, and it consists of an amplifier 3100 and a demodulator 3200. The amplifier 3100 amplifies the modulates signal from the leveling staff 2, and the demodulator 3200 delivers a demodulated signal to the microcomputer 166. The reception means 3000 constitutes a second reception device. The transmission means 2000 and reception means 3000 can be based on either a radio or infrared transceiver system.

The remaining arrangement of the second embodiment is identical to the first embodiment, and the explanation thereof is omitted.

Figure 8:
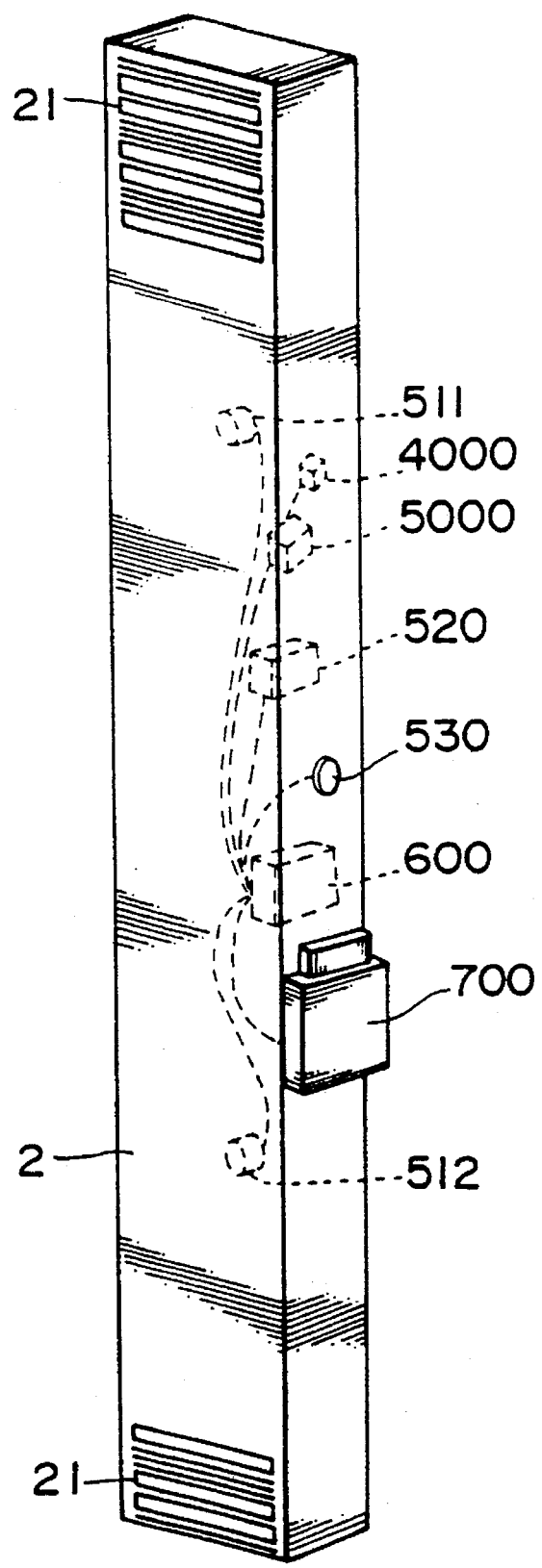
FIG. 8 is a diagram used to explain the arrangement of the leveling staff 2 used with the electronic level of the second embodiment.

Next, the leveling staff 2 used with the electronic level 1 of the second embodiment will be explained with reference to FIG. 8 and FIG. 9. In FIG. 8, the leveling staff 2 has a cyclic arrangement of a pattern set 21 for electronic reading, with each pattern set consisting of a first pattern A, second pattern B and third pattern R at a constant pitch of p. The leveling staff 2 is equipped with a thermal sensor set 510, a tilt sensor 520, a start switch 530, a computation processor 610, a display device 540, a transmitter 4000, and a receiver 5000.

The thermal sensor set 510, which is formed of thermistors in this embodiment, is intended to detect the ambient temperature around the leveling staff 2. It may be of another type instead of thermistors. The sensor set consists of a first and second thermal sensors 511 and 512 for detecting the temperatures at the higher and lower positions of the leveling staff 2, respectively, so that the ambient temperature of the leveling staff 2 is measured by averaging the detected values of the two sensors.

Figure 10:
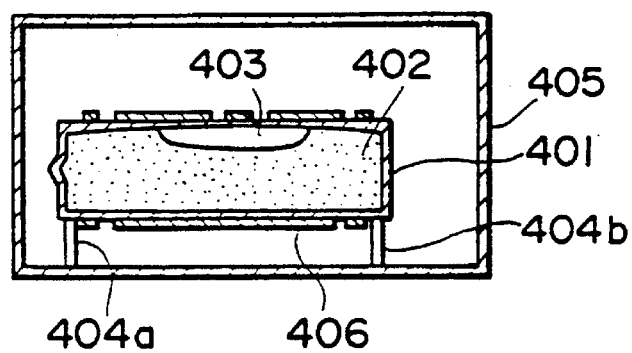
FIGS. 10, 11 and 12 are diagrams used to explain the tilt sensor 520 based on the second embodiment.
Figure 11:
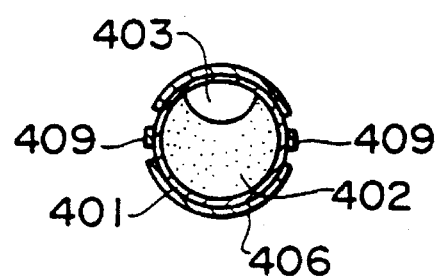
Figure 12:
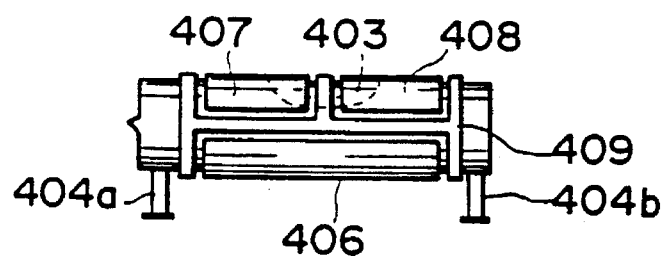

The tilt sensor 520 is intended to detect the tilt angle of the leveling staff 2. It consists of a chamber 401 made of an insulation material such as glass, in which are contained low-viscous liquid 402 and an air bubble 403, as shown in FIG. 10. The chamber 401 has its upper internal wall formed in a curving surface along the longitudinal direction, and it is housed in a shielding case 405 by being supported by lugs 404a and 404b. In FIG. 12, a first electrode 406 is fitted on the lower external surface of the chamber 401 to cover about ⅔ of its entire length (a range of about 170°), and a second and third electrodes 407 and 408 are fitted by being spaced out from each other on the upper external surface section (a range of about 170°) confronting the first electrode 406. A guard electrode 409 is formed to surround the first, second and third electrodes so as to eliminate the leakage conductance and minimize the stray capacitance among the electrodes. With an equal potential being given to the first electrode 406 and guard electrode 409, a voltage is applied between the first electrode 406 and second electrode 407, or between the first electrode 406 and third electrode 408, and the tilt angle is evaluated from the variation in the amount of charging.

The start switch 530 constitutes a measurement start switch means, and, by being operated by the workman, it activates the transmitter 4000 to sends the measurement start command to the computation processor 610. It is also possible to put the start switch 530 on the electronic level 1 instead of the leveling staff 2 so that the leveler at the electronic level 1 has entire control of the measuring operation.

The computation processor 610 controls the whole electrical system of the leveling staff 2. It receives signals from the thermal sensor set 510, tilt sensor 520 and start switch 530, displays data on the display device 540, and sends various data to the electronic level 1 through the transmitter 4000. The computation processor 610 also receives signals from the electronic level 1 through the receiver 5000 and displays it on the display device 540. The display device 540 constitutes a display means.

The transmitter 4000 sends the staff readiness signal and data obtained on the leveling staff to the electronic level 1. It consists of a modulator 4100 which operates in accordance with commands of the computation processor 610, and a driver 4200 which amplifies the modulated signal. The computation processor 610 modulates the staff readiness signal and data obtained on the leveling staff so that they are transferred to the electronic level 1. The staff readiness signal represents the measurement start approval to the electronic level 1, for example. The data obtained on the leveling staff 2 includes the ambient temperature data produced by the thermal sensor set 510, tilt angle data produced by the tilt angle sensor 520 and identification number of the leveling staff. The transmitter 4000 constitutes a second transmission device. Transferred data may further includes the time of measurement when the computation processor 610 is equipped with a clock device. It is also possible for the computation processor 610 to send the data to the external memory means 700.

The receiver 5000 receives measured data such as the height difference and horizontal distance sent from the operation indicator means 1000 of the electronic level 1. The receiver 5000 consists of an amplifier 5100 which amplifies the modulated signal from the transmitter of the electronic level 1, and a demodulator 5200 which delivers a demodulated signal to the computation processor 610. The receiver 5000 constitutes a first reception device.

Next, the operation of the electronic leveling systems based on the first and second embodiments of the invention will be explained with reference to FIG. 13 and FIG. 14.

Figure 13:
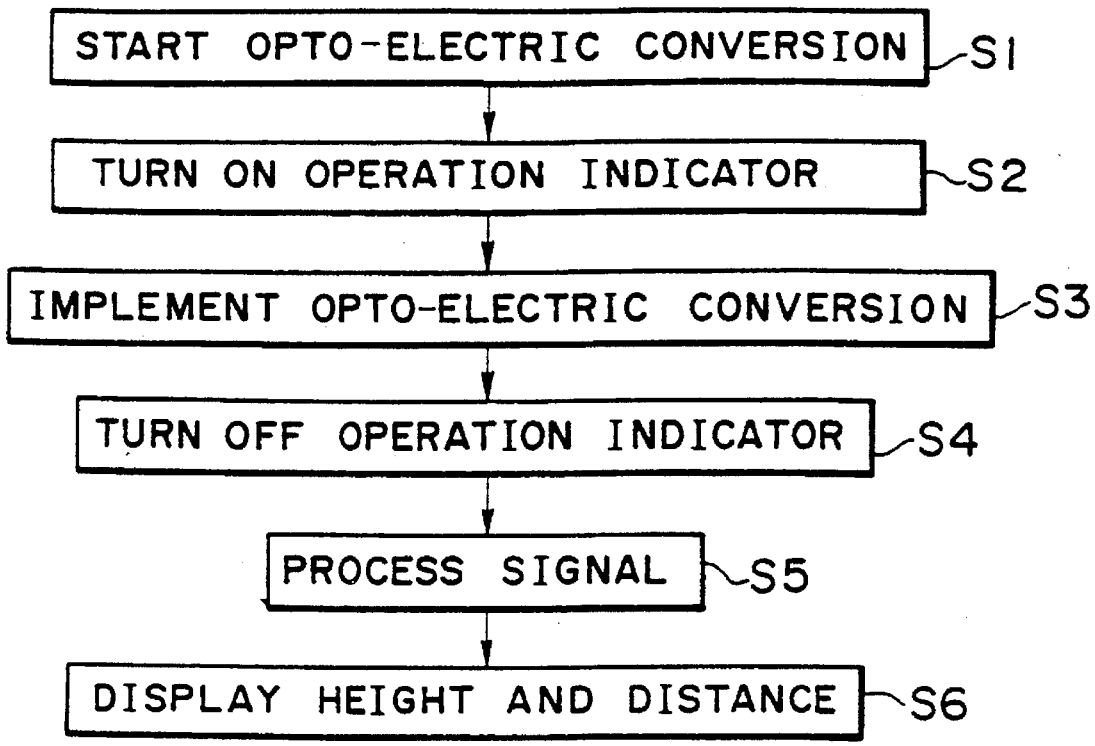
FIG. 13 is a flowchart used to explain the operation on the part of the electronic level 1 of the second embodiment.

FIG. 13 shows the operation on the part of the electronic level 1. At the first step S1, the electronic level 1 is set up, and the linear sensor 15 starts the opto-electric signal converting operation. In the next step S2, the LED driver 1100 is activated to turn on the LED 1200. On completion of the opto-electric converting operation in step S3, the LED driver 1100 is disactivated to turn off the LED 1200 and the operation indicator 1000 is turned off in step S4.

The foregoing operation of the case of using the operation indicator 1000 may be altered to the second embodiment in which the electronic level 1 operates on its transmission means 2000 to send the signal "amid measurement" to the receiver 5000 of the leveling staff 2.

In the next step S5, the arithmetic processor 1664 calculates the height difference and the horizontal distance to the leveling staff 2 based on the electrical signal provided by the linear sensor 15.

The principle of horizontal distance measurement will be explained with reference to FIG. 15. The lens of the electronic level 1 produces an image length of w for the pattern pitch p, and the distance L from the lens to the staff 2 is calculated from the pattern pitch p and the distance d between the lens and image as:

$$L=d(p/w)$$

Since d is approximately equal to the focal distance f of the lens, $$L \cong f(p/w)$$

With the linear sensor 15 having a pixel length of C and an output wavelength of k corresponding to the pattern pitch p, the image length w produced by the lens is expressed as w=Ck. Accordingly, the distance (horizontal distance) L between the level 1 and staff 2 is calculated as follows.

$$L=(f/(C \times k)) \times p \tag{6}$$

Subsequently, the workman presses the start switch 530 on the leveling staff 2, and the transmitter 4000 sends data of the ambient temperature and staff tilt angle to the reception means 3000 of the electronic level 1. The modified height difference calculator 1669 of the electronic level 1 implements the modifying calculation for the height difference based on the ambient temperature and tilt angle of the leveling staff 2.

The modified height difference calculator 1669 of the electronic level 1 implements the following modifying calculation for the height h provided by the arithmetic processor 1664 of the electronic level 1 to compensate the tilt angle θ of the leveling staff detected by the tilt sensor 520. The modified height h' is calculated as:

$$h'=h \times \cos\theta \tag{7}$$

The modified height difference calculator 1669 implements the following modifying calculation for the height h provided by the arithmetic processor 1664 to compensate the ambient temperature t (°) detected by the thermal sensor 510 of the leveling staff 2. The modified height h' is calculated as:

$$h'=h \times (1+(t-t_0) \times p \times 10^{-6}) \tag{8}$$

where $t_0$ is the reference temperature (°), and p is the coefficient of thermal expansion (ppm) of the leveling staff.

Accordingly, the modified height difference calculator 1669 calculates the above formulas (7) and (8) to evaluate the modified height h'.

On completion of the computational process of step S5, the operational sequence proceeds to S6 to display the modified height h' and the horizontal distance L between the electronic level 1 and leveling staff 2 on the display device 167.

Figure 14:
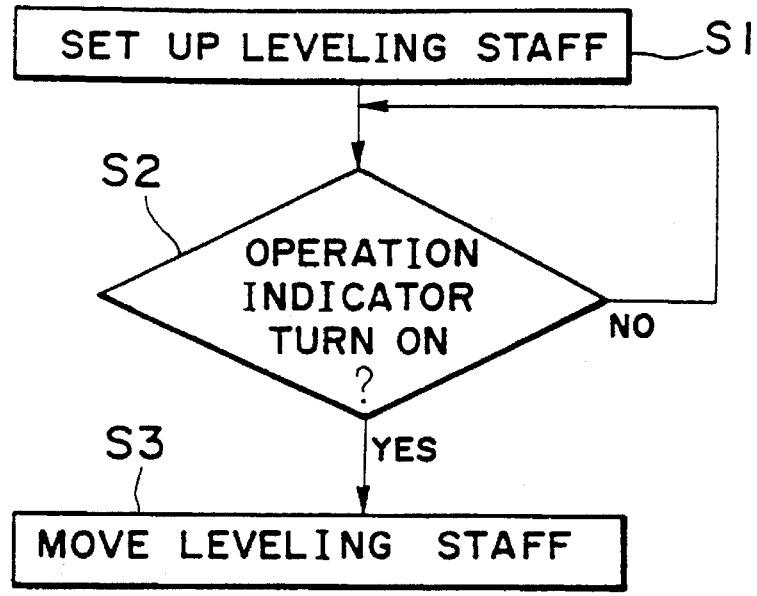
FIG. 14 is a flowchart used to explain the operation on the part of the leveling staff 2 of the second embodiment.

FIG. 14 shows the operation on the part of the leveling staff 2. At the first step S1, the leveling staff 2 is set up. In the next step S2, it is checked whether or not the display on the operation indicator 1000 of the electronic level 1 is turned off. On finding the absence of display on the operation indicator 1000 in step S2, the leveling staff 2 is moved to the next measurement position in step S3. If the display on the operation indicator 1000 is still on, the operational sequence returns to step S1.

Although the foregoing operation is the case of using the operation indicator 1000, the system may be altered such that a signal "amid measurement" is sent from the transmission means 1000 of the electronic level 1 to the receiver 5000 of the leveling staff 2.

[Embodiment 3]

Figure 16:
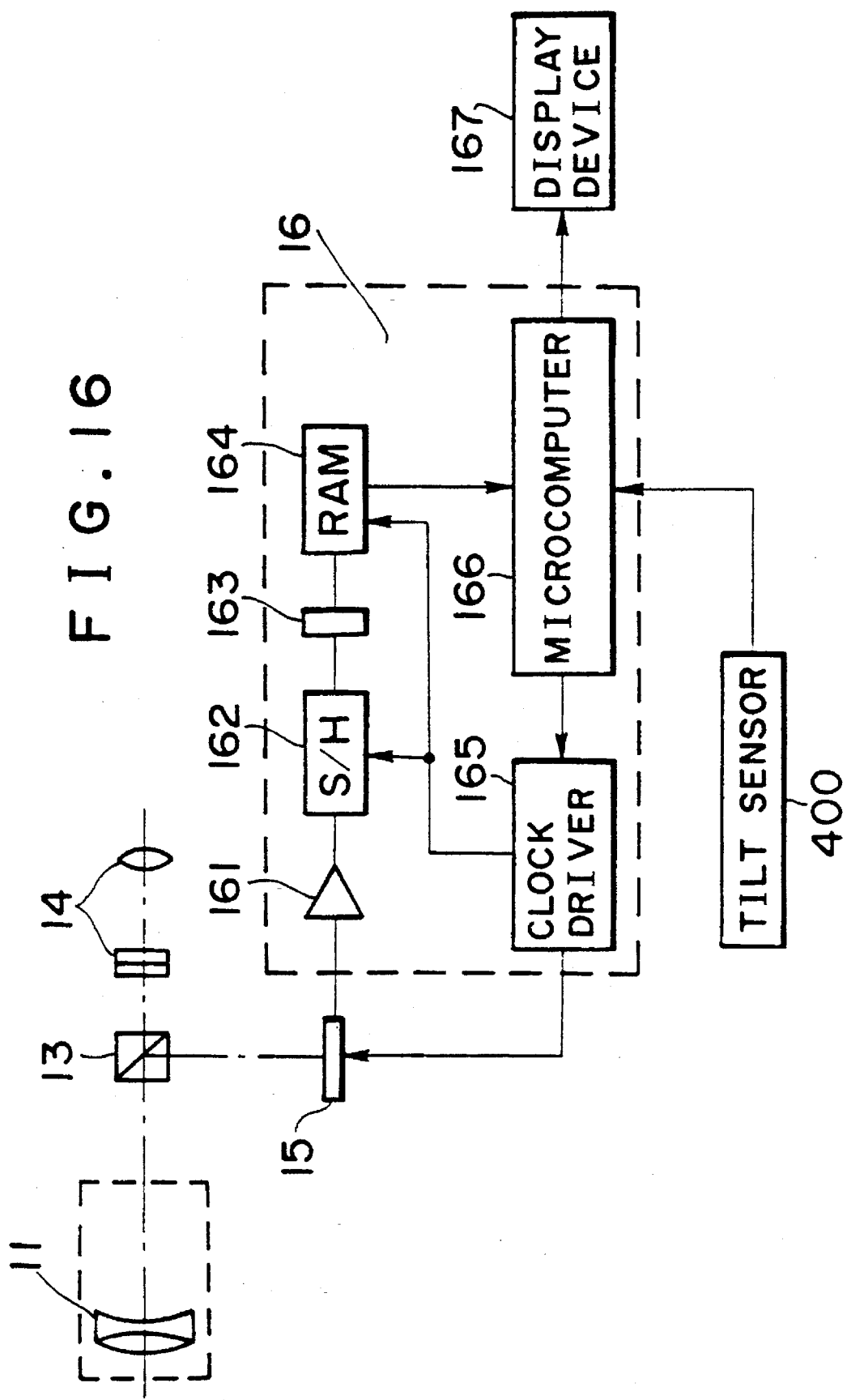
FIG. 16 is a block diagram showing the electronic level 1 based on the third embodiment of this invention.

The electronic level 1 based on the third embodiment of this invention will be explained. This electronic level is equipped with a tilt detector for detecting the inclination of the sight line of the electronic level, and it consists of an optical system including an objective lens set 11, a beam splitter 13 and an eyepiece set 14, a linear sensor 15, a computation means 16 and a tilt sensor 400, as shown in FIG. 16.

The computation means 16, which constitutes a measuring device, consists of an amplifier 161, a sample-holding circuit 162, an A/D converter 163, a RAM 164, a clock driver 165 and a microcomputer 166, and it is connected with a display device 167.

Figure 17:
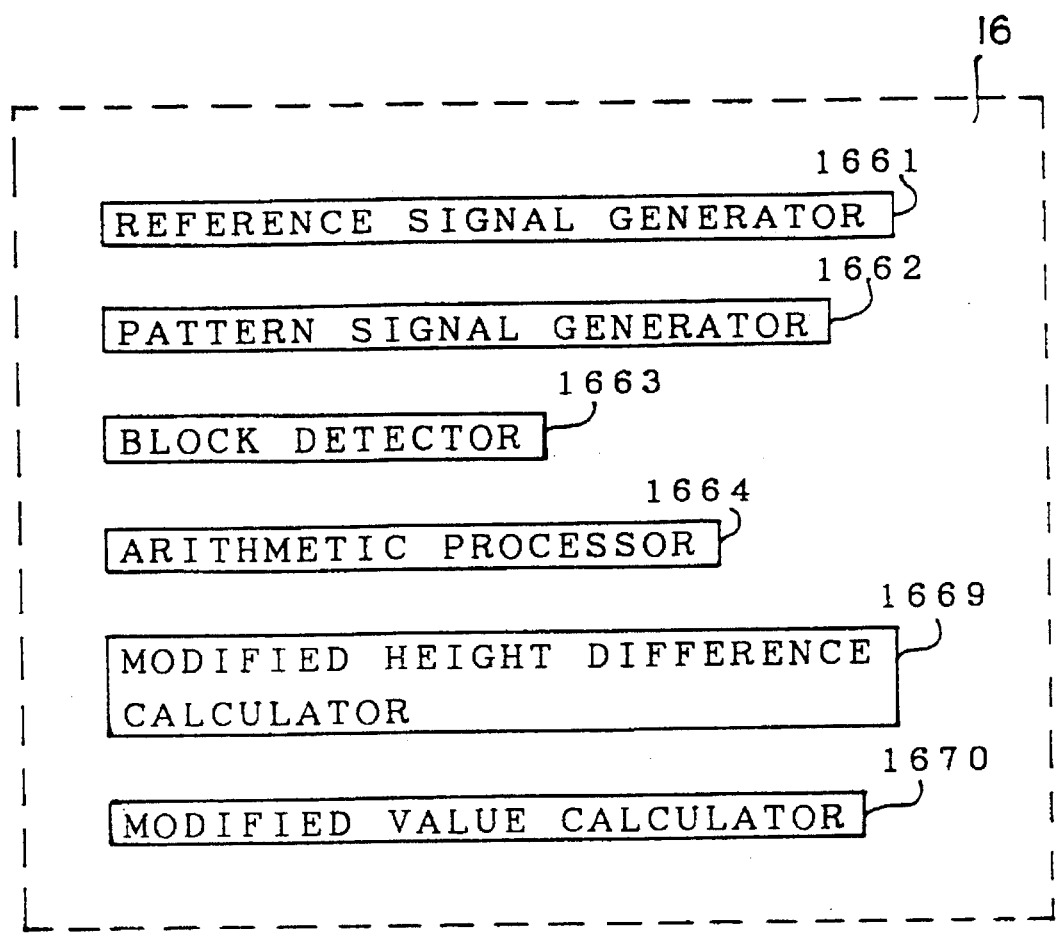
FIG. 17 is a block diagram showing the arrangement of the computation means 16 of the electronic level 1 of the third embodiment.

The computation means 16 is made up of functional blocks, which are a reference signal generator 1661, a pattern signal generator 1662, an arithmetic processor 1664, a modified height difference calculator 1669, and a modified value calculator 1670, as shown in FIG. 17.

The tilt sensor 400, which constitutes a electronic level tilt detector, is intended to detect inclination angle of the sight line of the electronic level 1, and it may be a device similar to the tilt sensor 520 of the leveling staff 2. The modified height difference calculator 1669 calculates a modified height difference based on the horizontal distance measured by the measuring device and the tilt angle detected by the tilt sensor 520.

The modification of height difference based on the detected tilt angle will be explained. The modified height h' is calculated from the tilt angle θ of the telescopic optical system detected by the tilt sensor 400, the distance L between the electronic level 1 and leveling staff 2, and the height h measured by the measuring device of the electronic level 1 as:

$$h' = h + L \times \sin\theta \qquad (9)$$

Accordingly, the modified height difference calculator 1669 calculates the above formula (9).

Figure 18:
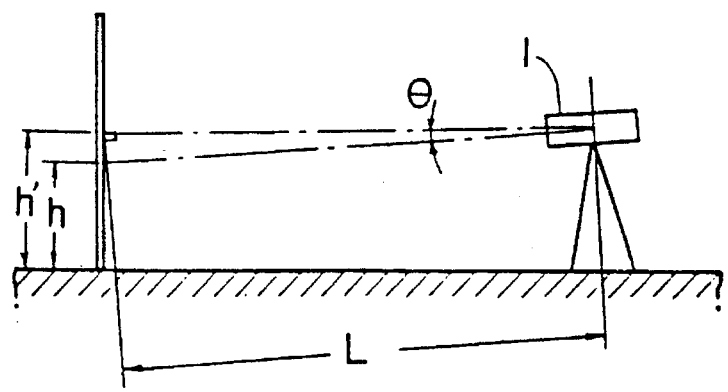
FIG. 18 is a diagram used to explain the modifying calculation of the height difference for compensating the tilt of the electronic level based on the third embodiment.

The computation of height difference modification against the tilt of optical system will be explained specifically with reference to FIG. 18. In case the distance L between the electronic level 1 and leveling staff 2 is 20 meters, the tilt angle θ of the telescopic optical system is 5 minutes, and the height h measured by the measuring device of the electronic level 1 is 1.5 meters, the modified height h' is calculated based on the formula (9) as follows.

$$h' = 1.5 + 20 \times \sin(5 \text{ minutes}) = 1.52908 \text{ meters}$$

The error of distance measurement is:

$$1.5 \times \sin(5 \text{ minutes}) = 2.18 \text{ mm}$$

With the error of distance L being corrected, the modified height is calculated as:

$$h41 = 1.5 + (20 + 2.18 \times 10^{-3}) \times \sin(5 \text{ minutes}) = 1.52909 \text{ meters}$$

Accordingly, the distance error is negligibly small, and the calculation of the formula (9) suffices for the modification of measured height.

The modified value calculator 1670 calculates the amount of modification from the horizontal distance, the height difference and the modified value calculated by the modified height difference calculator 1669. The amount of modification provided by the modified value calculator 1670 is displayed together with the modified height h' on the display device 167. The leveler can compare the displayed value with the visual reading on the scale 22 of the leveling staff 2 observed through the optical system.

Figure 19:
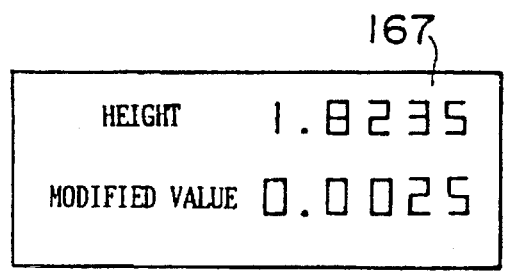
FIG. 19 is a diagram used to explain the display device 167 of the third embodiment.

The display device 167, which can be a liquid crystal display device or the like, is intended to display the height difference calculated by the modified height difference calculator 1669 and the amount of modification calculated by the modified value calculator 1670 as shown in FIG. 19. These display data may be delivered to an external memory means or the like. The display device 167 also serves as the modified value display device.

The third embodiment is further capable of performing the abnormality (tilt) detection for the electronic level 1 by monitoring the output signal of the tilt sensor 400. For example, the computation means 16 operates on the display device 167 to indicate an alarm signal in response to the detection by the tilt sensor 400 of a tilt angle of ±5 minutes or more of the electronic level 1.

Figure 20:
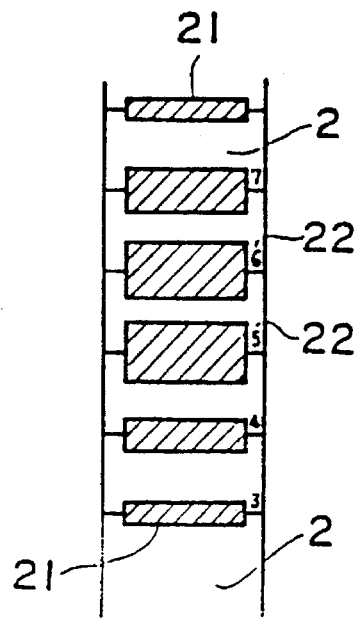
FIG. 20 is a diagram used to explain the leveling staff 2 used with the electronic level of the third embodiment.

The leveling staff 2 used with the electronic level 1 of the third embodiment is provided with a visual scale 22 on the side of the electronic reading pattern 21 as shown in FIG. 20.

The remaining arrangement is identical to the preceding embodiments, and explanation thereof is omitted.

[Embodiment 4]

The leveling staff for the electronic level based on the fourth embodiment of this invention will be explained. This leveling staff has a memory for storing tilt angle data of staff and the like.

Figure 21:
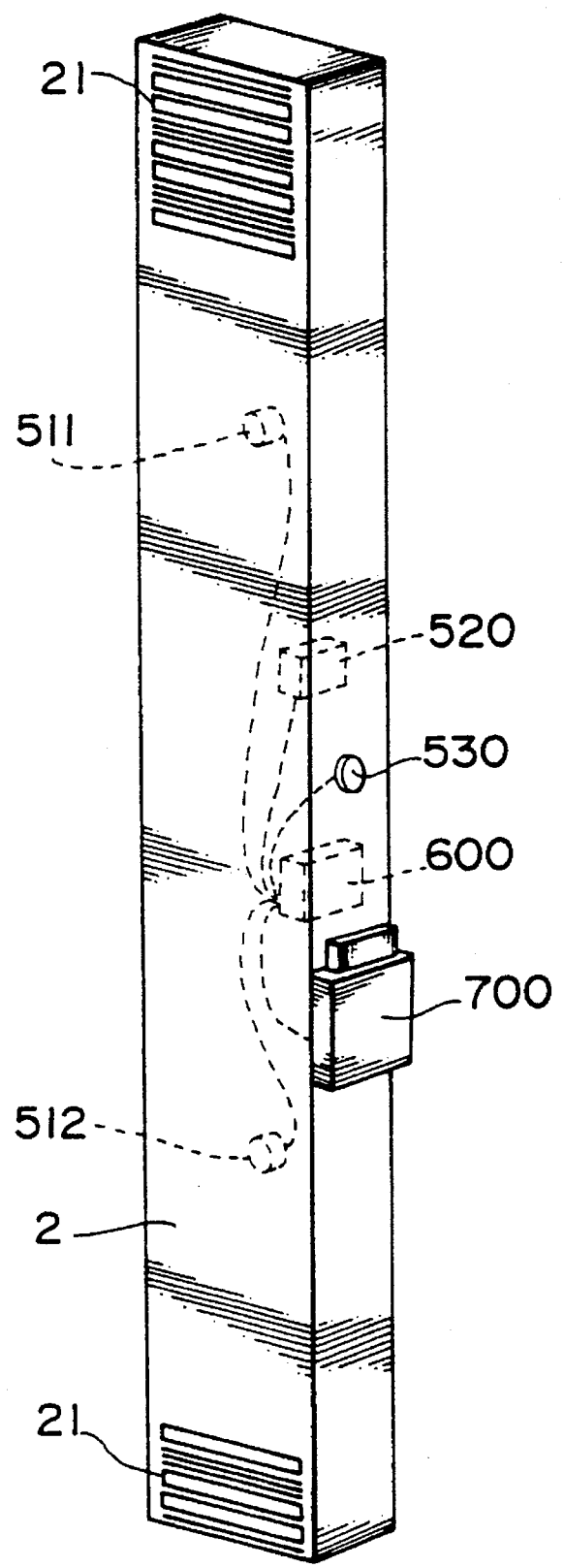
FIG. 21 is a diagram used to explain the arrangement of the leveling staff 2 based on the fourth embodiment of this invention.
Figure 22:
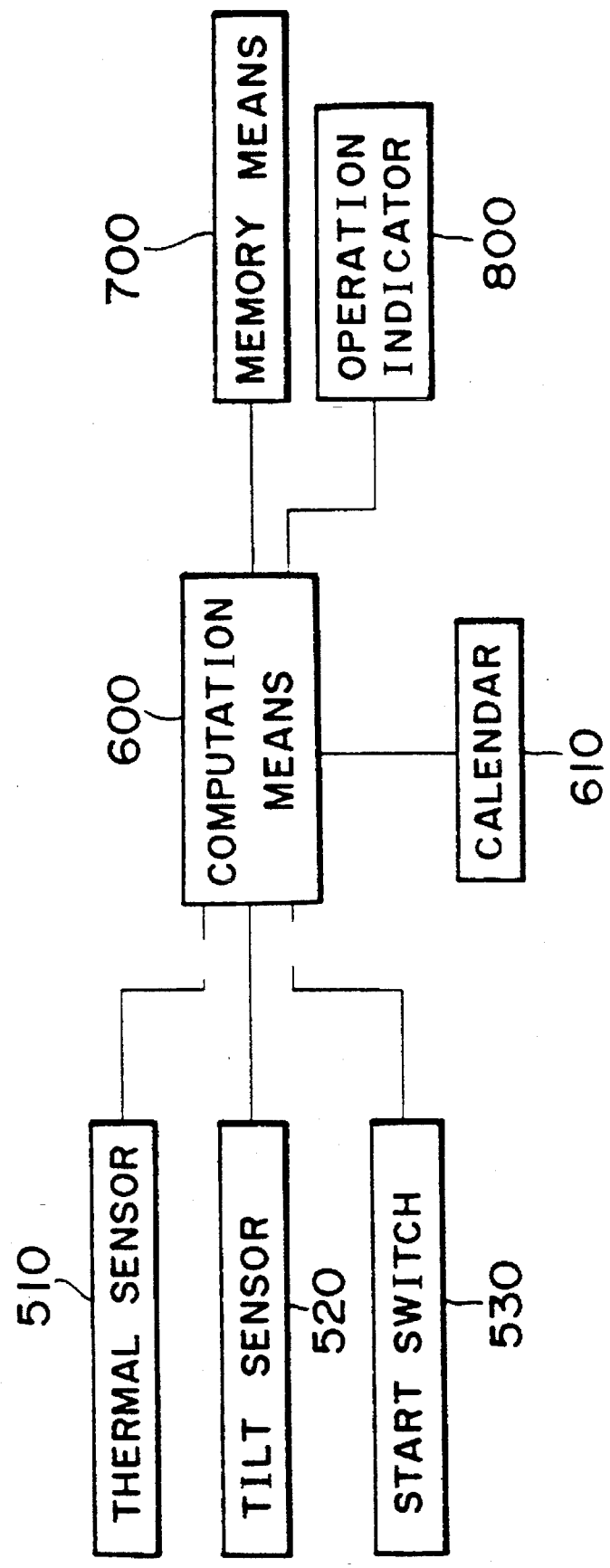
FIG. 22 is a diagram used to explain the electrical arrangement of the leveling staff 2 of the fourth embodiment.

The leveling staff 2 has a cyclic arrangement of a pattern set 21 for electronic reading, with each pattern set consisting of a first pattern A, second pattern B and third pattern R at a constant pitch of p, as shown in FIG. 21. The leveling staff 2 is equipped with a thermal sensor 510, thermister 511, 512, a tilt sensor 520, a start switch 530, a computation means 600, and a memory means 700 as shown in FIG. 22.

The start switch 530 constitutes a start switch means for starting the memorizing operation of the tilt angle memory means, and it also constitutes a start switch means for starting the memorizing operation of the temperature memory means. The computation means 600 controls the whole electrical system, and it also functions to determine based on the detected signal from the tilt sensor 520 as to whether or not the electronic level i is ready for the measurement.

The memory means 700 constitutes the tilt angle memory means for memorizing the tilt angle detected by the tilt sensor 520, and it also constitutes the temperature memory means for memorizing the temperature detected by the thermal sensor 510. The memory means 700 of this embodiment is a memory card that is detachable from the computation means 600. The memory means 700 may be of another type such as a floppy disk or IC card.

After the leveling staff 2 has been set up, the workman presses the start switch 530. Then, the computation means 600 fetches the tilt angle θ of the leveling staff 2 from the tilt sensor 520 and stores it in the memory means 700.

In the fourth embodiment, the height h measured by the electronic level 1 and the tilt angle θ read out of the memory means 700 are transferred to the computer and the modified height h' is calculated based on the formula (7). In case the leveling apparatus is not the electronic level 1, the readout value on the apparatus can be modified with the tilt angle θ read out of the memory means 700 to evaluate the modified height h' based on the formula (7).

With the leveling staff 2 having an allowable tilt angle range of ±15 minutes for example, an alarm signal is emitted if the tilt angle exceeds ±10 minutes. The leveling staff 2 of this embodiment has an operation indicator 800 formed of LED so that the leveler at the electronic level 1 can visually confirm the readiness of the leveling staff 2. In this embodiment, on detecting a tilt angle greater than 10 minutes by the tilt sensor 520, the computation means 600 operates on the operation indicator 800 to blink, or it is turned on continuously when the tilt angle is within 10 minutes. The operation indicator 800 for indicating whether or not the tilt angle θ is within the allowable range may be based on any other scheme instead of the blinking or continuous light emission.

Consequently, the leveler at the electronic level 1 can check the tilt of leveling staff, and the sequential operation of setting up the leveling staff and measuring the height difference can be carried out smoothly.

In the fourth embodiment, the computation means 600 responds to the operation of the start switch 530 to receive the tilt angle θ from the tilt sensor 520 and the ambient temperature of the leveling staff 2 from the thermal sensor 510, and stores these data in the memory means 700. At the time of modifying calculation, the computation means 600 reads the temperature t out of the memory means 700 and calculates the modified height h' based on the formula (8). The remaining operation is identical to the case of modification by the tilt angle θ, and explanation thereof is omitted.

It is also possible to connect a calendar 610 to the computation means 600 to detect the time of temperature measurement by the thermal sensor 510, and memorize the time in the memory means 700. This enables time-based logging for measured data of height difference of many places, making the postprocessing of data easy and reliable. The calendar 610 constitutes a time measuring means.

The display device 167, which may be a liquid crystal device, displays the height difference calculated by the arithmetic processor 1664. The calculation result may be delivered to an external memory means or the like. In the fourth embodiment, the height h calculated by the arithmetic processor 1664 is transferred to the computer and a modified height h' is obtained through the calculation of formulas (7) and (8) in response to the tilt angle θ and temperature t read out of the memory means 700. The remaining arrangement is identical to the preceding embodiments, and explanation thereof is omitted.

Although the foregoing embodiments have been explained for the case with the leveling staff for the electronic level, they can also be applied to the usual leveling apparatus. In this case, the scale pattern 21 for electronic reading is not required and only the scale for visual measurement is used.

The present invention described above resides in an electronic leveling system consisting of a leveling staff having a prescribed scale pattern and a electronic leveling unit that measures the elevation of the sighted portion of the leveling staff. In the electronic level unit, the telescopic optical system forms an image of the scale pattern, the opto-electric transducer converts the pattern image into a pattern signal, the measuring device calculates the height based on the pattern signal, and the first transmission device sends the measurement data from the electronic level to the leveling staff.

The signal sent by the first transmission device can be a signal indicative of the state of "amid measurement" of the measuring device, allowing the workman at the leveling staff to know easily and surely that the electronic level is operating for measurement.

The leveling staff can be equipped with a first reception device for receiving the signal sent from the electronic level, and this signal can include measurement status data and working instructions. The signal sent by the first transmission device can be an optical signal or acoustic signal.

The leveling staff can further be equipped with a second transmission device for sending measurement work data from the leveling staff to the electronic level.

The leveling staff is equipped with a tilt sensor for detecting the tilt angle of the leveling staff, and the tilt signal is sent to a second reception device provided on the electronic level. The measuring device measures the horizontal distance from the electronic level to the leveling staff based on the pattern signal, and it can modify the elevation evaluated from the pattern signal based on the inclination of sight line detected by the staff tilt sensor thereby to determine an accurate elevation. Consequently, the modification process for the tilt of leveling staff and the ambient temperature can be done all on the part of the electronic level, and the measuring work can be carried out efficiently.

The electronic level is equipped with a tilt sensor for detecting the inclination of sight line, and the measuring device can modify the elevation evaluated from the pattern signal based on the inclination of sight line detected by the level tilt sensor thereby to determine an accurate elevation. It is also possible for the measuring device to evaluate the horizontal distance from the electronic level to the leveling staff based on the period or frequency of the pattern signal.

The first reception device of the leveling staff receives data of the elevation and horizontal distance from the first transmission device of the electronic level and the arithmetic processor implements the computation based on the received data. Consequently, it is easily possible to set up a front and rear leveling staffs in an equal distance from the electronic level in carrying out the level measurement, and the leveling staffs can be moved smoothly and the efficiency of leveling work is improved.

It is possible for the second transmission device of the leveling staff to send the tilt data, which is detected by the tilt sensor, to the electronic level. The memory of the leveling staff can store the tilt data which is used to evaluate the elevation that is rid of the influence of the tilt of leveling staff.

The memory is formed of a storage medium such as an IC card, memory card or floppy disk, and it can be detachable from the leveling staff.

The measuring device of the electronic level can modify the elevation, which is evaluated from the pattern signal provided by the opto-electric transducer, based on the tilt data received by the second reception device from the leveling staff thereby to obtain an accurate elevation.

The tilt sensor of the electronic level detects the inclination of the sight line of the electronic level, and the elevation evaluated from the pattern signal can be modified based on the tilt data of the sight line thereby to obtain an accurate elevation, whereby an accurate height difference can be obtained even if the electronic level tilts.

What is claimed is:

1. An electronic leveling system comprising a leveling staff on which a prescribed pattern is formed and an electronic leveling unit for measuring the height (elevation) of a sighted portion of said leveling staff, said electronic leveling unit including a telescopic optical system for forming an image of the pattern of leveling staff; an opto-electric transducer for converting the pattern image formed by said telescopic optical system into a pattern signal; a measuring device for evaluating the elevation based on the pattern signal provided by said opto-electric transducer; and a first transmission device for sending a signal necessary for the measuring work from said electronic level unit to said leveling staff.

2. An electronic leveling system according to claim 1, wherein said signal sent by said first transmission device is a signal indicating that said measuring device is amid measurement.

3. An electronic leveling system according to claim 1, wherein said leveling staff includes a first reception device for receiving the signal sent from said electronic level unit, said signal sent by said first transmission device represents a measurement status or working instruction.

4. An electronic leveling system according to claim 1, wherein said signal sent by said first transmission device is an optical or acoustic signal.

5. An electronic leveling system comprising a leveling staff on which a prescribed pattern is formed and an electronic leveling unit for measuring the height (elevation) of a sighted portion of said leveling staff, said electronic leveling unit including a telescopic optical system for forming an image of the pattern of leveling staff; an opto-electric transducer for converting the pattern image formed by said telescopic optical system into a pattern signal; a measuring device for evaluating the elevation based on the pattern signal provided by said opto-electric transducer, said leveling staff including a staff transmission device for sending a signal necessary for the measuring work from said leveling staff to said electronic level unit.

6. An electronic leveling system according to claim 5, wherein said leveling staff further includes a tilt sensor for detecting the tilt of leveling staff, wherein said signal sent by said staff transmission device represents data of the tilt detected by said tilt sensor, and wherein said electronic level unit further includes a second reception device for receiving the signal sent from said leveling staff, said measuring device evaluating the horizontal distance from said electronic level unit to said leveling staff based on the pattern signal and implementing the modification of the elevation, which is evaluated from the pattern signal, based on said tilt data provided by said tilt sensor of leveling staff thereby to obtain an accurate elevation.

7. An electronic leveling system according to claim 1 or claim 5, wherein said electronic level unit further includes a tilt sensor for detecting the inclination of the sight line of electronic level unit based on a horizontal plane, said measuring device evaluating the horizontal distance from said electronic level unit to said leveling staff based on the pattern signal and implementing the modification of the elevation, which is evaluated from the pattern signal, based on the inclination data provided by said tilt sensor of electronic level unit thereby to obtain an accurate elevation.

8. An electronic leveling system according to claim 7, wherein said measuring device evaluates the horizontal distance from said electronic level unit to said leveling staff based on the period or frequency of the pattern signal.

9. A leveling staff used with an electronic level apparatus, said leveling staff comprising a first reception device for receiving a data signal, which represents an elevation and horizontal distance, sent from a first transmission device of said electronic level apparatus; and an arithmetic processor that implements a prescribed computation based on data received by said first reception device.

10. A leveling staff used with an electronic level apparatus, said leveling staff comprising a tilt sensor for detecting the tilt of leveling staff; and a staff transmission device for sending data of the tilt detected by said tilt sensor to said electronic level apparatus.

11. A leveling staff used with an electronic level apparatus, said leveling staff comprising a tilt sensor for detecting the tilt of leveling staff; and a memory device for storing data of the tilt detected by said tilt sensor, said tilt data being used to obtain an accurate staff elevation which is rid of the influence of the tilt of leveling staff.

12. A leveling staff according to claim 11, wherein said memory device comprises a storage medium such as an IC card, memory card or floppy disk, said memory device being detachable from said leveling staff.

13. An electronic leveling apparatus for measuring the height (elevation) of a sighted portion of a leveling staff on which a prescribed pattern is formed, said apparatus comprising a telescopic optical system for forming an image of said pattern of leveling staff; an opto-electric transducer for converting the pattern image formed by said telescopic optical system into a pattern signal; a measuring device for evaluating the elevation based on the pattern signal provided by said opto-electric transducer; and a first transmission device for sending a signal necessary for the measuring work from said electronic level apparatus to said leveling staff.

14. An electronic leveling apparatus according to claim 13, wherein said signal sent by said first transmission device is a signal indicating that said measuring device is amid measurement.

15. An electronic leveling apparatus for measuring the height (elevation) of a sighted portion of a leveling staff on which a prescribed pattern is formed, said apparatus comprising a telescopic optical system for forming an image of said pattern of leveling staff; an opto-electric transducer for converting the pattern image formed by said telescopic optical system into a pattern signal; a measuring device for evaluating the elevation based on the pattern signal provided by said opto-electric transducer; and a second reception device for receiving a signal sent from said leveling staff, said measuring device implementing the modification of the elevation, which is evaluated from the pattern signal, based on tilt data of said leveling staff received by said second reception device thereby to obtain an accurate elevation.

16. An electronic leveling system according to claim 13 or claim 15 further including a tilt sensor for detecting the inclination of the sight line of apparatus based on a horizontal plane, said measuring device evaluating the horizontal distance from said apparatus to said leveling staff based on the pattern signal and implementing the modification of the elevation, which is evaluated from the pattern signal, based on the inclination data provided by said tilt sensor of said apparatus thereby to obtain an accurate elevation.

17. An electronic leveling apparatus according to claim 16, wherein said measuring device evaluates the horizontal distance from said electronic level apparatus to said leveling staff based on the period or frequency of the pattern signal.

* * * * *

UNITED STATES PATENT AND TRADEMARK OFFICE
CERTIFICATE OF CORRECTION

PATENT NO. : 5,537,201
DATED : July 16, 1996
INVENTOR(S) : Kumagai et al.

It is certified that error appears in the above-indentified patent and that said Letters Patent is hereby corrected as shown below:

Column 4, line 15, that portion of Equation (3) reading "(2π)" should read --(2π))--;

Column 6, line 33, that portion of the equation reading "ti Xa" should read --Xa--;

Column 12, line 7, that portion of the equation reading "h41" should read --h"--;

Column 12, line 60, "level i" should read --level 1--.

Signed and Sealed this

Twenty-sixth Day of November 1996

Attest:

BRUCE LEHMAN

Attesting Officer

Commissioner of Patents and Trademarks